United States Patent [19]

Cole et al.

[11] 4,072,194
[45] Feb. 7, 1978

[54] PUMPABLE EPOXY RESIN COMPOSITION

[75] Inventors: Robert Clay Cole, Marlow; Ronney R. Koch; Joseph Ramos, both of Duncan, all of Okla.

[73] Assignee: Halliburton Company, Duncan, Okla.

[21] Appl. No.: 371,100

[22] Filed: June 18, 1973

[51] Int. Cl.² ............................................. E21B 33/14
[52] U.S. Cl. .................................... 166/295; 61/36 R
[58] Field of Search .......................... 166/295, 305 D; 61/36 R

[56] References Cited

U.S. PATENT DOCUMENTS

| | | | |
|---|---|---|---|
| 3,141,304 | 7/1964 | Moore | 61/36 R |
| 3,291,213 | 12/1966 | Bezemer et al. | 166/295 |
| 3,294,166 | 12/1966 | Hauenaar et al. | 166/295 |
| 3,294,168 | 12/1966 | Bezemer et al. | 166/295 |
| 3,308,884 | 3/1969 | Robichaux | 166/295 |
| 3,310,111 | 3/1967 | Paulich et al. | 166/295 |
| 3,316,966 | 5/1967 | Dear | 166/295 |
| 3,552,493 | 1/1971 | Bezemer | 166/295 |

Primary Examiner—Ernest R. Purser
Attorney, Agent, or Firm—Robert S. Nisbett; John H. Tregoning; Thomas R. Weaver

[57] ABSTRACT

An epoxy resin composition curable to a hard impermeable solid which contains a liquid aromatic diluent having the general formula:

$$C_6(R_1)_6$$

wherein $R_1$ is hydrogen; a straight or branched chain alkyl radical; a cycloparaffin radical or a mixture thereof; wherein the alkyl and cycloparaffin radicals have within the range of about 1 to 10 carbon atoms; and further wherein at least one $R_1$ group is said alkyl or cycloparaffin radical.

13 Claims, No Drawings

PUMPABLE EPOXY RESIN COMPOSITION

Liquid waste from industrial plants is being disposed of by injecting the liquid waste into subterranean formations. Subterranean formations suitable for accepting liquid waste accept large volumes of waste and are generally separated by natural barriers from formations containing potable water or useful fluids such as oil and gas.

Some of the liquid waste which is disposed of in subterranean formations is corrosive to the steel and the hydraulic cement which is commonly used in the completion of well bores penetrating subterranean formations. In one method of completing well bores penetrating subterranean formations a steel conduit is placed in the well bore and a hydraulic cement sealing composition is placed between the conduit and the well bore to isolate the zones traversed by the well bore. An example of corrosive liquid waste being disposed of in this manner is acidic liquid waste from steel pickling baths. Acid can corrode steel to the point of failure and can dissolve hydraulic cement. If this happens, the liquid waste could be injected into a zone containing potable water or other useful fluids.

Well bores through which liquid waste is injected into subterranean formations should be completed with materials which will not be corroded by flowing the liquid waste through the well bore. Epoxy resin has been found to be resistant to degradation by liquid waste containing many organic and inorganic compounds.

To use epoxy resin for the completion of liquid waste disposal wells, the epoxy must be mixed with a curing agent which will cure the epoxy resin after a latent period such that the epoxy resin composition can be placed in the disposal well. The epoxy resin composition should also include a liquid diluent for the epoxy resin such that the epoxy resin composition will have a viscosity low enough for placing the epoxy resin composition in the disposal well. The diluent must also be able to absorb sufficient heat to prevent the epoxy resin composition from prematurely setting while the epoxy is being mixed with the curing agent and diluent. Additionally, the diluent must become part of the cured epoxy resin composition such that the cured epoxy resin composition will occupy substantially the same volume as the liquid epoxy resin composition and such that the diluent will be included in the matrix of the epoxy resin composition to provide a hard, impermeable, corrosion-resistant solid.

A suitable liquid diluent has now been found and is a diluent or mixture of diluents represented by the following general formula:

$$C_6(R_1)_6 \tag{1}$$

wherein $R_1$ is hydrogen; a straight or branched chain alkyl radical; a cycloparaffin radical, or a mixture thereof; wherein the alkyl and cycloparaffin radicals have within the range of about 1 to 10 carbon atoms; and further wherein at least one $R_1$ group is said alkyl or cycloparaffin radical. Preferred liquid diluents are diluents or mixture of diluents represented by the following general formula:

$$C_6H_2(R_2)_4 \tag{2}$$

wherein $R_2$ is hydrogen; a straight or branched chain alkyl radical; a cycloparaffin radical, or a mixture thereof; wherein the alkyl and cycloparaffin radicals have within the range of about 1 to 6 carbon atoms; and further wherein at least two $R_2$ groups are said alkyl or cycloparaffin radicals. The most preferred liquid diluents are diluents or mixtures of diluents represented by the following general formula:

$$C_6H_2(R_3)_4 \tag{3}$$

wherein $R_3$ is hydrogen; a straight or branched chain alkyl radical having within the range of about 1 to 3 carbon atoms, or mixtures thereof; and further wherein at least two $R_3$ groups are said alkyl radicals.

Examples of such suitable liquid diluents include but are not limited to toluene, ethylbenzene, n-propylbenzene, isopropylbenzene, n-butylbenzene, isobutylbenzene, cyclohexylbenzene, n-hexylbenzene, o-xylene, m-xylene, p-xylene, o-diethylbenzene, m-diethylbenzene, p-diethylbenzene, 2-chloro-p-xylene, o-diisopropylbenzene, m-diisopropylbenzene, p-diisopropylbenzene, 2-nitro-p-xylene, p-cymene, m-cymene, o-cymene, durene, isodurene, 1,2,3-trimethylbenzene, 1,2,4-trimethylbenzene, 1,3,5-trimethylbenzene, 1,3,5-triethylbenzene, 1,2,4-triethylbenzene, o-dibutylbenzene, m-dibutylbenzene, p-dibutylbenzene, penta-methylbenzene, 1-pentyl-3-ethylbenzene, p-pentyltoluene, 1-hexyl-3-isobutylbenzene, m-hexyltoluene, 1-heptyl-3-isopropylbenzene, p-heptyltoluene, 1-heptyl-3-ethylbenzene, 1-octyl-3-butylbenzene, 1-octyl-3-propylbenzene, p-octyltoluene, 1-nonyl-3-ethylbenzene, p-nonyltoluene, 1-dodecyl-3-ethylbenzene, p-isodecyltoluene, and 1-decyl-3-isotridecylbenzene.

Suitable epoxy resins are thermosetting resins based on the reactivity of the epoxide group. Epoxy resins made from epichlorohydrin and bisphenol A (p,p'-isopropylidenediphenol) are readily available and are particularly suitable for producing a pumpable resin composition curable to an impermeable, high strength solid. Suitable epoxy resins made from epichlorohydrin and bisphenol A are liquid epoxy resins having molecular weights of about 200 to 1000 and preferably about 300 to 500 and have one gram equivalent of epoxide per about 100 to 1000 grams of epoxy resin. An epoxy resin made from epichlorohydrin and bisphenol A which is particularly useful has one gram equivalent of epoxide per about 150 to 200 grams of the epoxy resin, an average molecular weight of about 400, and a viscosity at 25° C of about 100 to 200 poises.

Suitable curing agents for epoxy resins to form a composition which will cure after a latent period to a hard, impermeable solid include hardeners and mixtures of hardeners and accelerators. Useful hardeners for curing epoxy resin at temperatures of less than about 180° F include but are not limited to polyamides or condensation products of fatty or aliphatic polycarboxylic acid which preferably contain at least seven carbon atoms between the carboxyl groups and an aliphatic polyamine. Suitable polyamide hardening agents are derived from dimerized linoleic acid and ethylenediamine or diethyltriamine. Other fatty polyamides suitable for curing epoxy resin are derived from a mixture of polymeric fatty acids and dimerized rosin or from dimerized soybean-oil fatty acid. Commercial fatty polyamides are amber-colored thermoplastic compounds with molecular weights up to about 10,000 which have amine values of about 50 to 400. This amine value is expressed as the number of milligrams of KOH which is equivalent to the base content of one gram of fatty polyamide as determined by titration with hydrochloric acid.

An accelerator in combination with the hardener may also be useful to increase the reactivity of the hardener. Useful accelerators include but are not limited to paradimethylaminomethyl phenol, ortho-dimethylaminomethyl phenol, 2,4,6-tri(dimethylaminomethyl)phenol, benzyldimethylamine, or mixtures thereof.

A polyamide hardener is particularly useful for curing epoxy resin and may be used at a concentration within the range of about 10 to 30 and preferably about 17 to 25 parts by weight polyamide hardener per 100 parts by weight epoxy resin. The polyamide hardener is preferably mixed with the epoxy resin at a concentration lower than the stoichiometric concentration to increase the length of the latent period.

A particularly useful accelerator for use with the polyamide hardener is 2,4,6-tri(dimethylaminomethyl)phenol. This accelerator is useful within the concentration range of about 1 to 5 parts by weight accelerator per 100 parts by weight epoxy resin.

At temperatures above about 150° F, a hardener of the carboxylic acid anhydride type is useful. Suitable carboxylic acid anhydride type hardeners include but are not limited to methyl-bicyclo[2.2.1]heptene-2,3-dicarboxylic anhydride isomers (marketed by the Allied Chemical Company as Nadic Methyl Anhydride), chlorendic anhydride, phthalic anhydride, pyromellitic dianhydride, succinic anhydride, dodecenylsuccinic anhydride, maleic anhydride, hexahydrophthalic anhydride and mixtures thereof.

Nadic Methyl Anhydride is a particularly useful hardener for use at temperatures above about 150° F and is useful within the concentration range of about 60 to 130 and preferably about 90 to 110 parts by weight Nadic Methyl Anhydride per 100 parts by weight epoxy resin.

A particularly useful accelerator for use with the Nadic Methyl Anhydride hardener is 2,4,6-tri-dimethylaminomethyl)phenol. This accelerator is useful within the concentration range of about 1 to 10 parts by weight accelerator per 100 parts by weight epoxy resin. Other accelerators are also useful.

A solid diluent is also useful in this epoxy resin composition. The solid diluent reduces the cost of an epoxy resin composition and has been found to increase the shear strength and compressive strength of an epoxy resin composition. Additionally, solid diluents minimize the shrinkage of an epoxy resin composition on curing. Silica ground to about 200 to 325 mesh (U.S. Standard Sieve Series) has sufficient surface area such that it will remain suspended in an epoxy resin composition and can be added in sufficient concentrations to significantly dilute the epoxy resin composition. The addition of solid diluent does increase the viscosity of the epoxy resin composition. Therefore, the maximum concentration of solid diluent is determined by the viscosity of the resin composition to which the solid diluent is added. Generally, solid diluent can be added until the viscosity of the epoxy resin composition is increased to about 50 poises and preferably to less than about 30 poises which is the maximum viscosity which can readily be placed in a well bore penetrating a subterranean formation. Other finely divided particles which are not reactive with the components in the epoxy resin composition are also useful.

An epoxy resin composition containing epoxy resin and the aromatic diluent hereinabove described is useful for sealing the annular space between a conduit traversing a well bore penetrating a subterranean formation and the well bore. This epoxy resin composition cures to a hard, impermeable solid which seals the annular space to isolate the zones traversed by the well bore, thus permitting the selective use of a desired zone.

This epoxy resin composition is resistant to degradation by many chemicals contained in liquid waste which is disposed of in subterranean formations and is particularly useful for completing well bores penetrating subterranean formations and used for the disposal of liquid waste.

An epoxy resin composition curable to a hard, impermeable, corrosion-resistant solid, which is particularly suitable for completing a well bore penetrating a subterranean formation, is a mixture of epoxy resin, liquid diluent, curing agent and solid diluent. The epoxy resin is made from epichlorohydrin and bisphenol A and has one gram equivalent of epoxide per about 150 to 200 grams of epoxy resin, an average molecular weight of about 400, and a viscosity at 25° C of about 100 to 200 poises. The liquid diluent is selected from the group consisting of liquid diluents or mixtures of liquid diluents represented by the following general formula:

$$C_6H_2(R_3)_4 \tag{3}$$

wherein $R_3$ is hydrogen; a straight or branched chain alkyl radical having within the range of about 1 to 3 carbon atoms, or mixtures thereof; and further wherein at least two $R_3$ groups are said alkyl radicals. The solid diluent is silica ground to about 200 to 325 mesh (U.S. Standard Sieve Series). A polyamide hardener is used as a curing agent for the epoxy resin compositions cured at temperatures of less than about 160° F and Nadic Methyl Anhydride hardener is used for epoxy resin compositions cured at temperatures of greater than about 150° F. The polyamide is a commercial polyamide having an amine value of about 330 to 360 and a viscosity at 25° C of about 40,000 to 60,000 centipoises. When epoxy resin compositions are cured at temperatures requiring accelerators in combination with the hardening agent, they may be included in the resin composition. The polyamide hardener would be included in the epoxy resin composition at a concentration of about 17 to 25 parts by weight polyamide hardener per 100 parts by weight epoxy resin while the Nadic Methyl Anhydride hardener is included in the resin composition at a concentration of about 90 to 110 parts by weight Nadic Methyl Anhydride hardener per 100 parts by weight epoxy resin. The epoxy resin composition includes about 20 to 40 parts by volume liquid diluent and about 60 to 80 parts by volume epoxy resin to produce 100 parts by volume of the epoxy resin-diluent mixture. The epoxy resin composition, including epoxy resin, liquid diluent and curing agent, is mixed with 100 to 170 parts by weight solid diluent per 100 parts by weight of the epoxy resin composition to form an epoxy resin composition which is curable to a hard, impermeable, corrosion-resistant solid.

The epoxy resin composition described herein is suitable for many application where it is desirable to place a liquid composition which is curable to a hard, impermeable, corrosion-resistant solid. Additionally, this epoxy resin composition will bond to a wide variety of surfaces including, but not limited to, subterranean formations, salt and metal. These properties are desirable for a composition for grouting applications including the impregnation and hardening of soils and the rendering of dams, dikes, retaining walls, canal bank walls and the like, impervious to the passage of liquids. Other applications for this composition include the stabilization of load-bearing members such as piles and foundations in loose earth formations, repairing leaks in well casing and repairing cement to prevent communication between zones.

The following examples are presented to illustrate a pumpable epoxy resin composition. However, the invention is not limited thereto.

EXAMPLE I

The strength of an epoxy resin composition is determined. The epoxy resin composition is prepared by mixing an epoxy resin with a liquid aromatic diluent, a hardener, and an accelerator. The liquid epoxy resin has a viscosity of about 100 to 200 poises at 25° C; a molecular weight of about 300 to 500; and having one gram equivalent of epoxide per about 150 to 200 grams of epoxy resin. The aromatic diluent has a viscosity of about 1 to 3 centipoises at 25° C; a boiling range of about 360° F to 390° F, and contains a mixture of aromatic diluents which include aromatic diluents represented by the following general formulae: $C_6H_4(CH_3)(C_3H_7)$ $C_6H_3(CH_3)(C_2H_5)_2$; $C_6H_2(CH_3)(C_2H_5)(C_3H_7)$; and $C_6H_2(CH_3)_2(C_2H_5)$. The polyamide is a commercial polyamide having an amine value of about 330 to 360 and a viscosity at 25° C of about 40,000 to 60,000 centipoises. The epoxy resin and aromatic diluent are mixed at 64 parts by weight epoxy resin and 36 parts by weight aromatic diluent per 100 parts by weight of the epoxy resin-aromatic diluent mixture. The epoxy resin composition is 86 parts by weight epoxy resin-aromatic diluent mixture, 11 parts by weight polyamide hardener, and 3 parts by weight 2,4,6-tri(dimethylaminomethyl)phenol per 100 parts by volume epoxy resin composition. The resulting epoxy resin composition has a viscosity of about 100 centipoises at 80° F.

The compressive strength of the epoxy resin composition is determined by casting the epoxy resin composition into 2 inch cubes. The cubes are cured 48 hours at 120° F before testing. The cubes have a compressive strength of about 6650 PSI.

The bond strength of the epoxy resin composition to salt crystals is determined by casting the epoxy resin composition between two 2 × 2 × 0.666 inch salt crystals to form a 2 inch cube. The cube is cured eight hours at 140° F before testing the cubes for bond strength by measuring the shear strength of the cube at the interface of the epoxy resin composition and salt crystal. The shear strength is about 940 PSI.

The compressive strength and shear strength of the epoxy resin composition mixed with 150 parts by weight of about 200 to 325 mesh (U.S. Standard Sieve Series) silica per 100 parts by volume epoxy resin is determined by the same procedure. The silica increases the viscosity of the epoxy resin composition to about 3550 centipoises at 80° F. The mixture of silica and the epoxy resin composition has a shear strength of about 1875 PSI and a compressive strength of about 8440 PSI.

A 2 inch cube of the salt crystal has a shear strength of about 750 PSI and a compressive strength of about 4450 PSI.

The tensile strength of the epoxy resin composition after curing 48 hours at 120° F is about 650 PSI and the tensile strength of the epoxy resin composition mixed with silica is about 1000 PSI. The hydraulic bond of the epoxy resin composition to steel pipe after curing 48 hours at 120° F is about 3100 PSI and the hydraulic bond of the epoxy resin composition mixed with silica is greater than 5000 PSI.

The compressive strength of the epoxy resin composition is also determined by injecting the epoxy resin composition into a brine-wet sand pack to fill the spaces between the sand particles. After curing 48 hours at 120° F the epoxy resin composition impregnated sand pack has a compressive strength of about 7298 PSI.

EXAMPLE II

The strength of an epoxy resin composition is determined. The epoxy resin composition is prepared by mixing an epoxy resin mixture including a hardener, accelerator, and the liquid epoxy resin described in Example I with the aromatic diluent described in Example I. The epoxy resin and aromatic diluent are mixed at 64 parts by weight epoxy resin and 36 parts by weight aromatic diluent per 100 parts by weight of the epoxy resin-aromatic diluent mixture. The epoxy resin composition is 61 parts by weight liquid epoxy resin-aromatic diluent mixture, 38 parts by weight Nadic Methyl Anhydride hardener, and one part by weight 2,4,6-tri(-dimethylaminomethyl) phenol accelerator per 100 parts by weight of the epoxy resin composition. The resulting epoxy resin composition has a viscosity of about 86 centipoises at 80° F.

The epoxy resin composition is tested by the procedures described in Example I. After curing 48 hours at 120° F, the epoxy resin composition has a compressive strength of about 8560 PSI and a hydraulic bond to steel pipe of greater than 5000 PSI.

EXAMPLE III

Aromatic diluents are mixed in a curable epoxy resin formulation to determine the viscosity of the curable epoxy resin formulation containing the diluent, the temperature increase of the epoxy resin formulation on curing, the compressive strength of the cured epoxy resin formulation and the weight loss of the cured epoxy resin formulation due to loss of diluent from the cured epoxy resin formulation. The curable epoxy resin composition is a mixture of liquid epoxy resin with 19.8 parts by weight polyamide hardener, 5.45 parts by weight accelerator, and 19.8 parts by weight aromatic diluent per 100 parts by weight liquid epoxy resin.

The liquid epoxy resin, polyamide hardener and accelerator are described in Example I. The aromatic diluent is shown on Table I.

The curable epoxy resin composition is mixed at room temperature and the viscosity of the epoxy resin composition is measured immediately after mixing the composition. The viscosity measurements shown on Table I are made on a Brookfield Model LVF Viscometer with a No. 2 spindle. The peak exotherm was measured by placing 100 grams of the curable epoxy resin composition in an insulated container and measuring the temperature increase with a maximum reading thermometer. The weight loss of the cured epoxy composition on a cylindrical sample of the cured epoxy resin composition having a diameter of 0.86 inches and a length of 2 inches. The epoxy resin composition is cured for 24 hours in a 120° F water bath, removed from the molds and cooled to room temperature before measuring the weight of the sample to the nearest one-hundredth gram. The samples are then cured at 150° F and under a vacuum of 21-23 mmHg for 24 hours. The samples are then cooled to room temperature and the weight determined to the nearest one-hundredth gram. The compressive strength of the cured epoxy resin composition on a 2 inch section of the epoxy resin composition which is cast in a mold having an internal diameter of 1-3/16 inches and a length of 5 inches.

The data on Table I indicates that the aromatic diluents disclosed in this application produces a liquid epoxy resin composition with a viscosity such that the epoxy resin composition can be pumped and absorb sufficient heat to reduce the exotherm of the epoxy resin composition upon curing. These aromatic diluents also produce a cured epoxy resin composition with a high strength and a cured epoxy resin composition with the diluent included in the matrix of the epoxy resin composition to provide a hard, impermeable, corrosion-resistant solid which occupies substantially the same volume as the liquid epoxy resin composition.

This data also indicates that these diluents reduce the viscosity of the epoxy resin compositions and that the substitutions on the aromatic nucleus are important for high strength, low weight loss from the cured epoxy resin composition. It is seen that the highest strength epoxy resin compositions and the cured epoxy resin compositions with the lowest weight loss are the epoxy resin compositions prepared with aromatic diluents having at least two alkyl radicals and having about 1 to 3 carbon atoms in the alkyl radical.

TABLE I

| Epoxy Resin Compositions Containing Aromatic Diluents | | | | |
|---|---|---|---|---|
| Diluent | Viscosity (Centipoise) | Peak Exotherm (Δt ° F) | Compressive Strength (PSI) | Weight Loss (Parts by Weight)[1] |
| Benzene | 42.5 | 10 | 2724 | 24.45 |
| Toluene | 37.5 | 8 | 4785 | 24.07 |
| Xylene (mixed) | 46.5 | 13.5 | 5202 | 20.06 |
| o-xylene | 65 | 14 | 6082 | 16.7 |
| m-xylene | 49.5 | 14.5 | 5169 | 16.1 |
| p-xylene | 40 | 13.5 | 5431 | 20.34 |
| Mesitylene | 95 | 12 | 5543 | 11.86 |
| Durene | slurry | 45 | 4425 | — |
| Isodurene | 160 | 18 | 7058 | 7.7 |
| penta-methylbenzene | 167 | 24 | 7344 | 2.2 |
| Ethylbenzene | 46 | 13 | 4637 | 18.41 |
| Diethylbenzene (mixed) | 70 | 15 | 7697 | 7.3 |
| Butylbenzene | 51 | 10 | 6500 | 26.89 |
| p-cymene | 85 | 15 | 8817 | 5.9 |
| 2-chloro-p-xylene | 109 | 16 | 5711 | 25.43 |
| 2-nitro-p-cymene | 284 | 20 | 6772 | 21.14 |
| 1-methylnaphthalene | 370 | 25 | 7336 | 9.9 |
| Styrene | 40 | 14 | 2812 | 23.6 |
| cinnamaldehyde | 1050 | — | none | — |
| Mixed diluent[2] | 107 | 16 | 7193 | 10.81 |
| Dialkyl benzene[3] | 3075 | 56 | 10,259 | 3.0 |

[1]Parts by weight per 100 parts by weight of cured epoxy resin composition.
[2]A commercial mixed diluent containing diluents represented by the following general formulae:
$C_6H_4(CH_3)(C_3H_7)$, $C_6H_3(CH_3)(C_2H_5)_2$,
$C_6H_3(CH_3)_2(C_2H_5)$, and $C_6H_3(CH_3(C_2H_5)(C_3H_7)$.
A commercial dialkyl benzene diluent represented by the following general formula:

TABLE I-continued

| Epoxy Resin Compositions Containing Aromatic Diluents | | | | |
|---|---|---|---|---|
| Diluent | Viscosity (Centipoise) | Peak Exotherm (Δt ° F) | Compressive Strength (PSI) | Weight Loss (Parts by Weight)[1] | benzene ring with substituents: $CH_2-(CH_2)_a-CH_3$, $(CH_2)_b-CH_3$, $(CH_2)_c-CH_3$; $a + b + c = 18$ It will be apparent that many widely different embodiments of this invention may be made without departing from the spirit and scope thereof, and, therefore, it is not intended to be limited except as indicated in the appended claims.

What is claimed is:

1. A method of completing a well bore penetrating a subterranean formation, comprising the steps of placing in the space between a conduit traversing the well bore penetrating the subterranean formation and the subterranean formation an epoxy composition containing about 20-40 parts by volume of an aromatic diluent composition, wherein said aromatic diluent is selected to prevent premature setting by absorbing heat and to provide a cured epoxy resin composition occupying substantially the same volume as said pumpable epoxy resin; maintaining said epoxy resin composition in said space until said epoxy resin composition cures to a high strength, impermeable matrix with a weight loss of less than about 20 parts per 100 parts by weight of said pumpable epoxy resin composition; said pumpable epoxy resin composition comprising an epoxy resin, a curing agent and said selected aromatic diluent; wherein said selected aromatic diluent is at least one or a mixture containing an aromatic hydrocarbon of the general formula $C_6(R_1)_6$ wherein $R_1$ is hydrogen, a straight or branched chain alkyl radical, a cycloparaffin radical or a mixture thereof; wherein each alkyl and cycloparaffin radical has about 1-10 carbon atoms; and further wherein at least one $R_1$ group is said radical.

2. The method of completing a well bore penetrating a subterranean formation as recited in claim 1 wherein said epoxy resin is made from epichlorohydrin and p,p'-isopropylidenediphenol and has one gram equivalent of epoxide per about 150 to 200 grams of said epoxy resin, a molecular weight of about 400, and a viscosity at 25° C of about 100 to 200 poises.

3. A method of claim 1 wherein said pumpable epoxy resin composition contains said curing agent in a concentration less than stoichiometric to increase the latent period of said pumpable epoxy resin composition and said selected aromatic diluent.

4. A method of claim 1 wherein said selected aromatic diluent comprises a mixture of at least two of toluene, ethylbenzene, n-propylbenzene, isopropylbenzene, n-butylbenzene, isobutylbenzene, cyclohexylbenzene, n-hexylbenzene, o-xylene, m-xylene, p-xylene, o-diethylbenzene, m-diethylbenzene, p-ethylbenzene, 2-chloro-p-xylene, o-diisopropylbenzene, m-diisopropylbenzene, p-diisopropylbenzene, 2-nitro-p-xylene, p-cymene, m-cymene, durene, isodurene, 1,2,3-trimethylbenzene, 1,2,4-trimethylbenzene, 1,3,5-trimethylbenzene, 1,3,5-triethylbenzene, 1,2,4-triethylbenzene, o- dibutylbenzene, m-dibutylbenzene, p-dibutylbenzene, penta-methylbenzene, 1-pentyl-3-ethylbenzene, p-pentyltoluene, 1-hexyl-3-isobutylbenzene, m-hexyltoluene, 1-heptyl-3-isopropylbenzene, p-heptyltoluene, 1-heptyl-3-ethylbenzene, 1-octyl-3-butylbenzene, 1-octyl-3-propylbenzene, p-octyltoluene, 1-nonyl-3-ethylbenzene, p-nonyltoluene, 1-dodecyl-3-ethylene, p-isodecyltoluene and 1-decyl-3-isotridecylbenzene.

5. A method of completing a well bore penetrating a subterranean formation, comprising the steps of placing in a space between a conduit traversing the well bore penetrating the subterranean formation and the subterranean formation an epoxy composition containing about 20-40 parts by volume of an aromatic diluent composition, wherein said aromatic diluent is selected to prevent premature setting by absorbing heat and to provide a cured epoxy resin composition occupying substantially the same volume as said pumpable epoxy resin; maintaining said epoxy resin composition in said space until said epoxy resin composition cures to a high strength, impermeable matrix with a weight loss of less than about 20 parts per 100 parts by weight of said pumpable epoxy resin composition; said pumpable epoxy resin composition comprising an epoxy resin, a curing agent and said selected aromatic diluent; wherein said selected aromatic diluent is at least one or a mixture containing an aromatic hydrocarbon of the general formula $C_6H_2(R_2)_4$; wherein $R_2$ is hydrogen, a straight or branched chain alkyl radical; a cycloparaffin radical or a combination of said radicals; wherein each of said radicals have about 1-6 carbon atoms and wherein at least two $R_2$ groups are said radicals.

6. A method of claim 5 wherein said selected aromatic diluent comprises a mixture of aromatic hydrocarbons having a viscosity of about 1-3 centipoises at 25° C and boils at about 360°-390° F and 760 millimeter pressure.

7. The method of completing a well bore penetrating a subterranean formation as recited in claim 5 wherein said epoxy resin is made from epichlorohydrin and p,p'-isopropylidenediphenol and has one gram equivalent of epoxide per about 150 to 200 grams of said epoxy resin, a molecular weight of about 400, and a viscosity at 25° C of about 100 to 200 poises.

8. A method of claim 7 wherein said pumpable epoxy resin composition contains said curing agent in a concentration less than stoichiometric to increase the latent period of said pumpable epoxy resin composition and said selected aromatic diluent and wherein said pumpable epoxy composition contains a solid diluent.

9. The method of completing a well bore penetrating a subterranean formation as recited in claim 5 wherein said liquid aromatic diluent is selected from diluents or mixtures of diluents having the following general formula:

$$C_6H_2(R_3)_4 \qquad (3)$$

wherein $R_3$ is hydrogen; a straight or branched chain alkyl radical having within the range of about 1 to 3 carbon atoms, or mixtures thereof; and further wherein at least two $R_3$ groups are said alkyl radicals.

10. The method of completing a well bore penetrating a subterranean formation as recited in claim 9 wherein said epoxy resin is made from epichlorohydrin and p,p'-isopropylidenediphenol and has one gram equivalent of epoxide per about 150 to 200 grams of said epoxy resin, a molecular weight of about 400, and a viscosity at 25° C of about 100 to 200 poises.

11. The method of completing a well bore penetrating a subterranean formation as recited in claim 10 wherein said epoxy resin composition includes about 20 to 40 parts by volume of said liquid aromatic diluent and about 60 to 80 parts by volume of said epoxy resin per 100 parts by volume of the epoxy resin-aromatic diluent mixture.

12. A method of claim 11 wherein said pumpable epoxy resin composition contains said curing agent in a concentration less than stoichiometric to increase the latent period of said pumpable epoxy resin composition and said selected aromatic diluent and wherein said pumpable epoxy composition contains a solid diluent.

13. A method of claim 12 wherein said aromatic diluent comprises at least one or a mixture containing hydrocarbons represented by the formulae $C_6H_4(CH_3)(C_3H_7)$; $C_6H_3(CH_3)(C_2H_5)_2$; $C_6H_2(CH_3)(C_2H_5)(C_3H_7)$; and $C_6H_2(CH_2)(C_2H_5)$.

* * * * *